(12) United States Patent
Yung et al.

(10) Patent No.: US 11,421,359 B2
(45) Date of Patent: Aug. 23, 2022

(54) POLYAMIDE NANOFIBER NONWOVENS

(71) Applicant: Ascend Performance Materials Operations LLC, Houston, TX (US)

(72) Inventors: Wai-shing Yung, Pensacola, FL (US); Scott E. Osborn, Pensacola, FL (US); Chris E. Schwier, Pensacola, FL (US); Vikram Gopal, The Woodlands, TX (US); Albert Ortega, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 42 days.

(21) Appl. No.: 16/880,015

(22) Filed: May 21, 2020

(65) Prior Publication Data
US 2020/0283937 A1 Sep. 10, 2020

Related U.S. Application Data

(63) Continuation of application No. 16/003,528, filed on Jun. 8, 2018, now Pat. No. 10,662,561.
(Continued)

(51) Int. Cl.
*D04H 1/4334* (2012.01)
*D04H 3/016* (2012.01)
(Continued)

(52) U.S. Cl.
CPC ....... *D04H 1/4334* (2013.01); *D04H 1/43838* (2020.05); *D04H 1/552* (2013.01);
(Continued)

(58) Field of Classification Search
CPC ............ B01D 39/16; B01D 2239/0208; B01D 2239/0618; B01D 2239/1233;
(Continued)

(56) References Cited

U.S. PATENT DOCUMENTS 3,016,599 A 1/1962 Perry, Jr.
3,704,198 A 11/1972 Prentice
(Continued)

FOREIGN PATENT DOCUMENTS

EP 2202337 6/2010
JP 0673652 3/1994
(Continued)

OTHER PUBLICATIONS

Bresee et al., "Fiber Formation During Melt Blowing", International Nonwovens Journal, vol. 12, No. 2, 2003, pp. 21-28.
(Continued)

*Primary Examiner* — Camie S Thompson
(74) *Attorney, Agent, or Firm* — Cozen O'Connor

(57) ABSTRACT

A nanofiber nonwoven product is disclosed which comprises a polyamide with a relative viscosity from 2 to 330, spun into nanofibers with an average diameter of less than 1000 nanometers (1 micron). In general, the inventive products are prepared by: (a) providing a polyamide composition, wherein the polyamide has a relative viscosity from 2 to 330; (b) melt spinning the polyamide composition into a plurality of nanofibers having an average fiber diameter of less than 1 micron, followed by (c) forming the nanofibers into the product.

18 Claims, 6 Drawing Sheets

Related U.S. Application Data

(60) Provisional application No. 62/516,867, filed on Jun. 8, 2017, provisional application No. 62/518,769, filed on Jun. 13, 2017.

(51) Int. Cl.
| | |
|---|---|
| *D04H 1/56* | (2006.01) |
| *D04H 3/16* | (2006.01) |
| *D04H 1/4382* | (2012.01) |
| *D04H 1/552* | (2012.01) |
| *B82Y 40/00* | (2011.01) |

(52) U.S. Cl.
CPC .............. *D04H 1/56* (2013.01); *D04H 1/565* (2013.01); *D04H 3/016* (2013.01); *D04H 3/16* (2013.01); *B82Y 40/00* (2013.01)

(58) Field of Classification Search
CPC . B01D 2239/1258; B01D 46/546; D01F 6/60; D04H 1/4282; D04H 1/4334; D04H 3/016; D04H 1/4382; B82Y 40/00
USPC ............ 162/157.3; 442/327, 340, 333; 427/289.9; 523/222; 156/18, 162.4; 428/359, 364; 210/505
See application file for complete search history.

(56) References Cited

U.S. PATENT DOCUMENTS

| | | | |
|---|---|---|---|
| 3,755,527 A | 8/1973 | Keller et al. | |
| 3,849,241 A | 11/1974 | Butin et al. | |
| 3,978,185 A | 8/1976 | Buntin et al. | |
| 4,100,324 A | 7/1978 | Anderson et al. | |
| 4,118,531 A | 10/1978 | Hauser | |
| 4,663,220 A | 5/1987 | Wisneski et al. | |
| 4,760,129 A | 7/1988 | Haering et al. | |
| 5,411,710 A | 5/1995 | Iwasyk | |
| 5,504,185 A | 4/1996 | Toki et al. | |
| 5,543,495 A | 8/1996 | Anolick et al. | |
| 5,698,658 A | 12/1997 | Dujari et al. | |
| 5,913,993 A | 6/1999 | Ortega et al. | |
| 6,011,134 A | 1/2000 | Marks et al. | |
| 6,136,947 A | 10/2000 | Wiltzer et al. | |
| 6,169,162 B1 | 1/2001 | Bush et al. | |
| 7,138,482 B2 | 11/2006 | Tanaka et al. | |
| 7,300,272 B1 | 11/2007 | Haggard | |
| 7,381,788 B2 | 6/2008 | Tsujii et al. | |
| 8,277,711 B2 | 10/2012 | Huang et al. | |
| 8,658,067 B2 | 2/2014 | Peno et al. | |
| 8,668,854 B2 | 3/2014 | Marshall et al. | |
| 8,747,723 B2 | 6/2014 | Marshall et al. | |
| 8,759,475 B2 | 6/2014 | Thierry et al. | |
| 8,777,599 B2 | 7/2014 | Peno et al. | |
| 10,662,561 B2 * | 5/2020 | Yung | D04H 1/552 |
| 2008/0315464 A1 | 12/2008 | Smithies et al. | |
| 2011/0232653 A1 | 9/2011 | Imashiro et al. | |
| 2012/0178332 A1 | 7/2012 | Uchida et al. | |
| 2012/0244333 A1 | 9/2012 | Aksay et al. | |
| 2013/0112625 A1 | 5/2013 | Bahukudumbi et al. | |
| 2014/0097558 A1 | 4/2014 | Lustenberger | |
| 2015/0107457 A1 | 4/2015 | Huang et al. | |
| 2015/0111019 A1 | 4/2015 | Huang et al. | |
| 2015/0145175 A1 | 5/2015 | Lustenberger | |
| 2019/0194847 A1 | 6/2019 | Schoots et al. | |
| 2020/0254371 A1 * | 8/2020 | Yung | A62B 23/02 |

FOREIGN PATENT DOCUMENTS

| | | |
|---|---|---|
| JP | 08144166 | 6/1996 |
| JP | 2011031362 | 2/2011 |
| TW | 201042109 A | 12/2010 |
| WO | 2010014986 | 2/2010 |
| WO | 2012109251 | 8/2012 |
| WO | 2014074818 | 5/2014 |
| WO | 2015003170 | 1/2015 |
| WO | 2015153477 | 10/2015 |
| WO | 2017214085 | 12/2017 |

OTHER PUBLICATIONS

Ellison et al., "Melt Blown Nanofibers: Fiber Diameter Distributions and Onset of Fiber Breakup", Polymer, vol. 48, No. 11, May 21, 2007, pp. 3306-3316.

Glasscock et al., "High Performance Polyamides Fulfill Demanding Requirements for Automotive Thermal Management Components", Available Online at: http://www2.dupont.com/Automotive/en_US/assets/downloads/knowledge%20center/HTN-whitepaper-R8.pdf, Jun. 10, 2016, pp. 1-9.

Guerrini et al., "Electrospinning and Characterization of Polyamide 66 Nanofibers with Different Molecular Weights", Materials Research, vol. 12, No. 2, Apr.-Jun. 2009, pp. 181-190.

Hassan et al., "Fabrication of Nanofiber Meltblown Membranes and Their Filtration Properties", Journal of Membrane Science, vol. 427, Jan. 15, 2013, pp. 336-344.

Kirk-Othmer , "Plant-Growth Substances to Potassium Compounds", Encyclopedia of Chemical Technology, vol. 18, 3rd Edition, 1982, 47 pages.

International Application No. PCT/US2018/036637, International Preliminary Report on Patentability, dated Dec. 19, 2019, 8 pages.

International Application No. PCT/US2018/036637, International Search Report and Written Opinion, dated Sep. 14, 2018, 12 pages.

Melting Points of Polymers, Polymer Properties Database, accessed online Nov. 26, 2019, 2 pages.

Practice and Exploration on Preparation of High Performance Fibers from Flexible Chain Polymers, by Wenjuan Peng et al., Conference Title: Tongniu Cup Ninth Symposium on Functional Textiles and Nanotechnology, Wanfang Online Publication Date: Mar. 12, 2010, pp. 124-129.

* cited by examiner

POLYAMIDE NANOFIBER NONWOVENS

CROSS REFERENCE TO RELATED APPLICATIONS

This application is a continuation of U.S. Ser. No. 16/003,528, filed on Jun. 8, 2018, which claims priority to U.S. provisional patent application Nos. 62/516,867, filed Jun. 8, 2017, and 62/518,769, filed Jun. 13, 2017, which are incorporated herein by reference in their entireties.

TECHNICAL FIELD

The present disclosure relates to polyamide nanofiber nonwovens that may be useful for air and liquid filtration, breathable fabrics for apparel, acoustics, composites and packaging, as well as other applications.

BACKGROUND

Polymer membranes, including nanofiber and microfiber nonwovens are known in the art and are used for a variety of purposes, including in connection with filtration media and apparel. Known techniques for forming finely porous polymer structures include xerogel and aerogel membrane formation, electrospinning, melt-blowing, as well as centrifugal-spinning with a rotating spinneret, and two-phase polymer extrusion through a thin channel using a propellant gas. These techniques are either expensive or do not form nanofibers, e.g., polyamide nanofibers, with acceptable fiber diameter distributions. Electrospinning, in particular, is a relatively expensive process, and current melt-blowing techniques, while less expensive, are unable attain the nanofiber size that electrospinning can attain.

As one example, US Pub. No. 2014/0097558 A1 relates generally to methods of manufacture of a filtration media, such as a personal protection equipment mask or respirator, which incorporates an electrospinning process to form nanofibers onto a convex mold, which may, for example, be in the shape of a human face. US Pub. No. 2015/0145175 A1 provides similar disclosure.

WO 2014/074818 A2 discloses nanofibrous meshes and xerogels used for selectively filtering target compounds or elements from a liquid. Also described are methods for forming nanofibrous meshes and xerogels, methods for treating a liquid using nanofibrous meshes and xerogels, and methods for analyzing a target compound or element using nanofibrous meshes and xerogels. The nanofibers are comprised of polysiloxanes.

WO 2015/003170 A2 relates to nonwoven textiles consisting of webs of superfine fibers, e.g., fibers with diameters in nanoscale or micron scale ranges, for use in articles that have, for example a predetermined degree of waterproofness with breathability, or windproofness with breathability. The fibers may comprise polyurethane-based material or polytetrafluoroethylene.

WO 2015/153477 A1 relates to a fiber construct suitable for use as a fill material for insulation or padding, comprising: a primary fiber structure comprising a predetermined length of fiber; a secondary fiber structure, the secondary fiber structure comprising a plurality of relatively short loops spaced along a length of the primary fiber. Among the techniques enumerated for forming the fiber structures include electrospinning, melt-blowing, melt-spinning and centrifugal-spinning. The products are reported to mimic goose-down, with fill power in the range of 550 to 900.

Despite the variety of techniques and materials proposed, conventional products have much to be desired in terms of manufacturing costs, processability, and product properties.

SUMMARY

In some embodiments, the present disclosure is directed to a nanofiber nonwoven product comprising polyamide nanofibers, wherein the product has a relative viscosity from 2 to 330, and wherein the nanofibers have an average diameter from 100 to 1000 nanometers. The melt point of the product may be 225° C. or greater. In some aspects, no more than 20% of the nanofibers have a diameter of greater than 700 nanometers. The polyamide may comprise nylon 66 or nylon 6/66. In some aspects, the polyamide is a high temperature nylon. In some aspects, the polyamide comprises N6, N66, N6T/66, N612, N6/66, N6I/66, N66/6I/6T, N11, and/or N12, wherein "N" means Nylon. The product may have an Air Permeability Value of less than 600 CFM/ft². The product may have a basis weight of 150 GSM or less. The product may have a basis weight of 150 GSM or less. The product may have a TDI of at least 20 ppm. The product may have an ODI of at least 1 ppm. In some aspects, the product is free of solvent. In other aspects, the product comprises less than 5000 ppm solvent.

In some embodiments, the present disclosure is directed to a nanofiber nonwoven product comprising a polyamide which is spun into nanofibers with an average diameter from 100 to 1000 nanometers and formed into said nonwoven product, wherein the polyamide has a relative viscosity from 2 to 330. The melt point of the product may be 225° C. or greater. In some aspects, no more than 20% of the nanofibers have a diameter of greater than 700 nanometers. The polyamide may comprise nylon 66 or nylon 6/66. In some aspects, the polyamide is a high temperature nylon. In some aspects, the polyamide comprises N6, N66, N6T/66, N612, N6/66, N6I/66, N66/6I/6T, N11, and/or N12, wherein "N" means Nylon. The product may have an Air Permeability Value of less than 600 CFM/ft². The product may have a basis weight of 150 GSM or less. The product may have a basis weight of 150 GSM or less. The product may have a TDI of at least 20 ppm. The product may have an ODI of at least 1 ppm. In some aspects, the product is free of solvent. In other aspects, the product comprises less than 5000 ppm solvent.

In some embodiments, the present disclosure is directed to a nanofiber nonwoven product comprising a nylon 66 polyamide which is melt spun into nanofibers and formed into said nonwoven product, wherein the product has a TDI of at least 20 ppm and an ODI of at least 1 ppm. The product may have an Air Permeability Value of less than 600 CFM/ft². The product may have a basis weight of 150 GSM or less. In some aspects, the product is free of solvent. In other aspect, the product comprises less than 5000 ppm solvent. In some aspects, no more than 20% of the nanofibers have a diameter of greater than 700 nanometers. The nylon 66 polyamide may have an RV from 2 to 330. The product may have an RV from 2 to 330.

In some embodiments, the present disclosure is directed to a nanofiber nonwoven product comprising a nylon 66 polyamide which is melt spun into nanofibers and formed into said nonwoven product, wherein no more than 20% of the nanofibers have a diameter of greater than 700 nanometers. The product may have an Air Permeability Value of less than 600 CFM/ft². The product may have a basis weight of 150 GSM or less. The product may have a basis weight of 150 GSM or less. The product may have a TDI of at least 20 ppm. The product may have an ODI of at least 1 ppm. In some aspects, the product is free of solvent. In other aspects, the product comprises less than 5000 ppm solvent. The nylon 66 polyamide may have an RV from 2 to 330. The product may have an RV from 2 to 330.

In some embodiments, the present disclosure is directed to a method of making a nanofiber nonwoven product, the method comprising: (a) providing a polyamide composition, wherein the polyamide has a relative viscosity from 2 to 330; (b) spinning the polyamide composition into a plurality of nanofibers having an average fiber diameter from 100 to 1000 nanometers; and (c) forming the nanofibers into the nanofiber nonwoven product, wherein the polyamide nanofiber layer has an average nanofiber diameter from 100 to 1000 nanometers and a relative viscosity from 2 to 330. In some aspects, the polyamide composition is melt spun by way of melt-blowing through a die into a high velocity gaseous stream. In some aspects, the polyamide composition is melt-spun by 2-phase propellant-gas spinning, including extruding the polyamide composition in liquid form with pressurized gas through a fiber-forming channel. The product may be formed by collecting the nanofibers on a moving belt. The polyamide nanofiber layer may have a basis weight of 150 GSM or less. In some aspects, the relative viscosity of the polyamide in the nanofiber nonwoven product is reduced as compared to the polyamide composition prior to spinning and forming the product. In some aspects, the relative viscosity of the polyamide in the nanofiber nonwoven product is the same or increased as compared to the polyamide composition prior to spinning and forming the product.

BRIEF DESCRIPTION OF DRAWINGS

The disclosure is described in detail below with reference to the drawings wherein like numerals designate similar parts and wherein.

DETAILED DESCRIPTION

Overview

Figure 1:
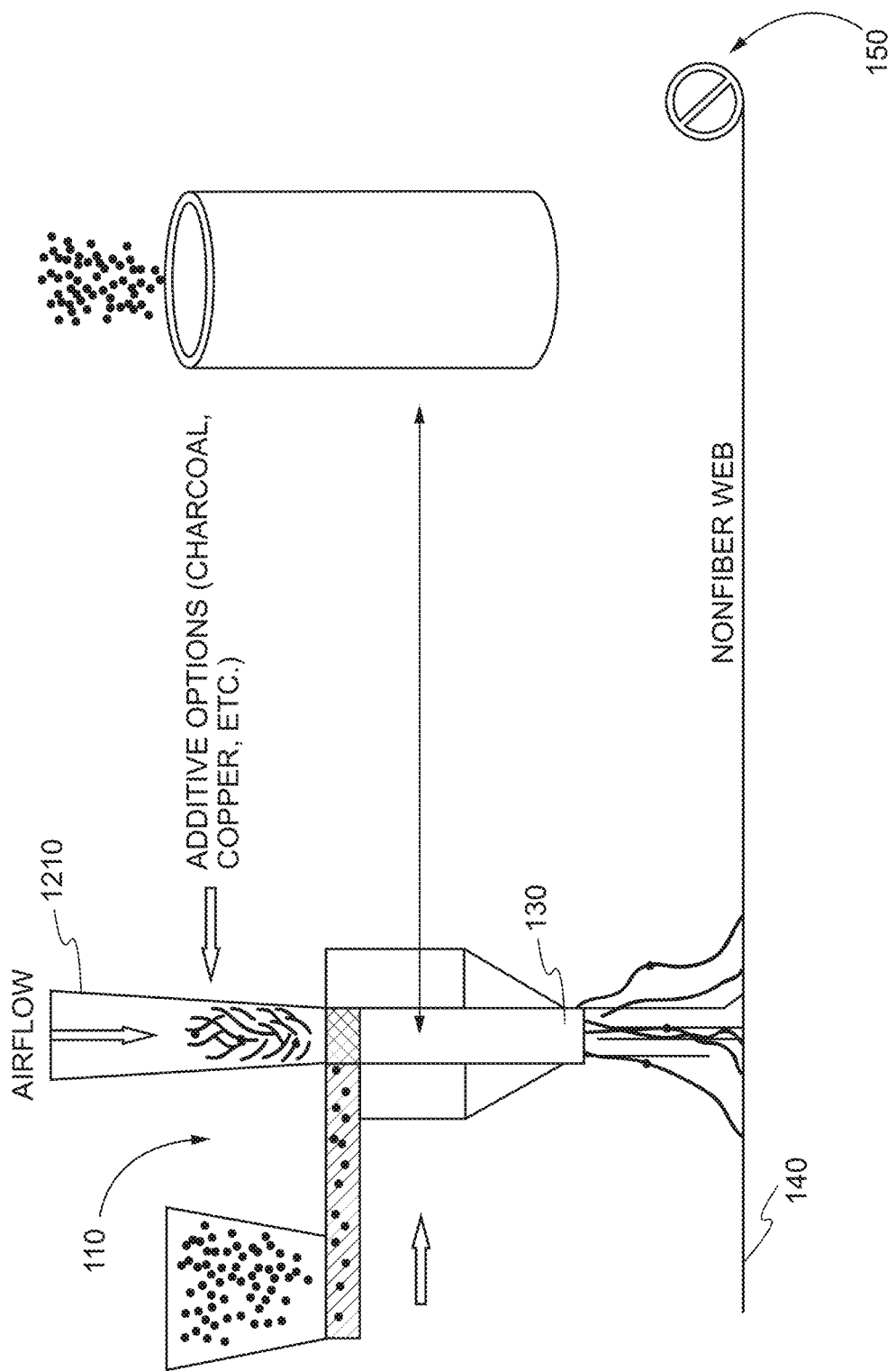
FIG. 1 and FIG. 2 are separate schematic diagrams of a 2-phase propellant-gas spinning system useful in connection with the present disclosure.

The present disclosure is directed, in part, to a nanofiber nonwoven product formed from a (precursor) polyamide composition. The product may have a Relative Viscosity (RV) from 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 (additional RV ranges and limits are provided herein).

The polyamide composition may be spun or melt blown into fibers, e.g., nanofibers. The polyamide nanofibers may have an average diameter of less than 1000 nanometers (1 micron) and may be formed into the nonwoven product. Traditional melt spinning/melt blowing techniques have been unable to form fibers having low average diameters, e.g., nanofibers. Typical melt spun/melt blown fiber average diameters are at least 1 micron and cannot achieve the surface area to volume ratio that a nanofiber can achieve. Such an increased surface area to volume ratio is beneficial in many applications.

The inventors have found that by utilizing a particular precursor polyamide having specific characteristics in a particular (melt) spinning process, nonwoven nanofibers having synergistic features are formed. Without being bound by theory, it is postulated that the use of a polyamide composition having an RV of 330 or less leads to fibers having small diameters, previously unachievable by conventional solvent-free processes. As an additional benefit, the production rate is advantageously improved, for example, on a per meter basis, over processes such as electrospinning and solution spinning. Such improvements may be by at least 5%, e.g., by at least 10%, by at least 15%, by at least 20%, by at least 25%, or by at least 30%.

Also, the inventors have found that the disclosed processes, techniques, and/or precursors, yield nanofibers having reduced oxidative degradation and thermal degradation indices as compared to nonwoven products prepared from other precursors and by other processes. These improvements advantageously result in products with improved durability.

Additionally, the process may be conducted in the absence of solvents, e.g., does not use solvents, such as formic acid and others described herein, which reduces environmental concerns with disposing of the solvents and handling of the solvents during preparation of the solutions. Such solvents are used in solution spinning and the solution spinning process therefore requires additional capital investment to dispose of the solvents. Additional costs may be incurred due to the need for a separate solvent room and a scrubber area. There are also health risks associated with some solvents. Accordingly, the nanofiber nonwoven product may be free of residual solvents, e.g., as are necessarily present in solution spun products. For example, residual solvent from 2.2 to 5 wt. % may be found in solution spun processes, as disclosed by L. M. Guerrini, M. C. Branciforti, T Canova, and R. E. S. Bretas, Materials Research, Vol. 12, No. 2, pp 181-190 (2009).

In some aspects, no adhesives are included in the nanofiber nonwoven product. Such adhesives are often included to adhere electrospun fibers to scrims. Although the nanofiber nonwoven product described herein may be blown onto a scrim, no such adhesives are necessary.

In some embodiments, the nanofiber nonwoven product is produced by: (a) providing a (spinnable) polyamide composition, wherein the polyamide composition has the RV discussed herein; (b) spinning the polyamide composition into a plurality of nanofibers having an average fiber diameter of less than 1 micron, e.g., by way of a process directed to 2-phase propellant-gas spinning, including extruding the polyamide composition in liquid form with pressurized gas through a fiber-forming channel, and (c) forming the nanofibers into the nanofiber nonwoven product. The general process is illustrated in FIGS. 1 and 2.

Particularly preferred polyamides include nylon 66, as well as copolymers, blends, and alloys of nylon 66 with nylon 6. Other embodiments include nylon derivatives, copolymers, terpolymers, blends and alloys containing or prepared from nylon 66 or nylon 6, copolymers or terpolymers with the repeat units noted above including but not limited to: N6T/66, N612, N6/66, N6I/66, N11, and N12, wherein "N" means Nylon. Another preferred embodiment includes High Temperature Nylons ("HTN") as well as blends, derivatives, copolymers or terpolymers containing them. Furthermore, another preferred embodiment includes long chain aliphatic polyamide made with long chain diacids as well as blends, derivatives or copolymers containing them.

Figure 2:
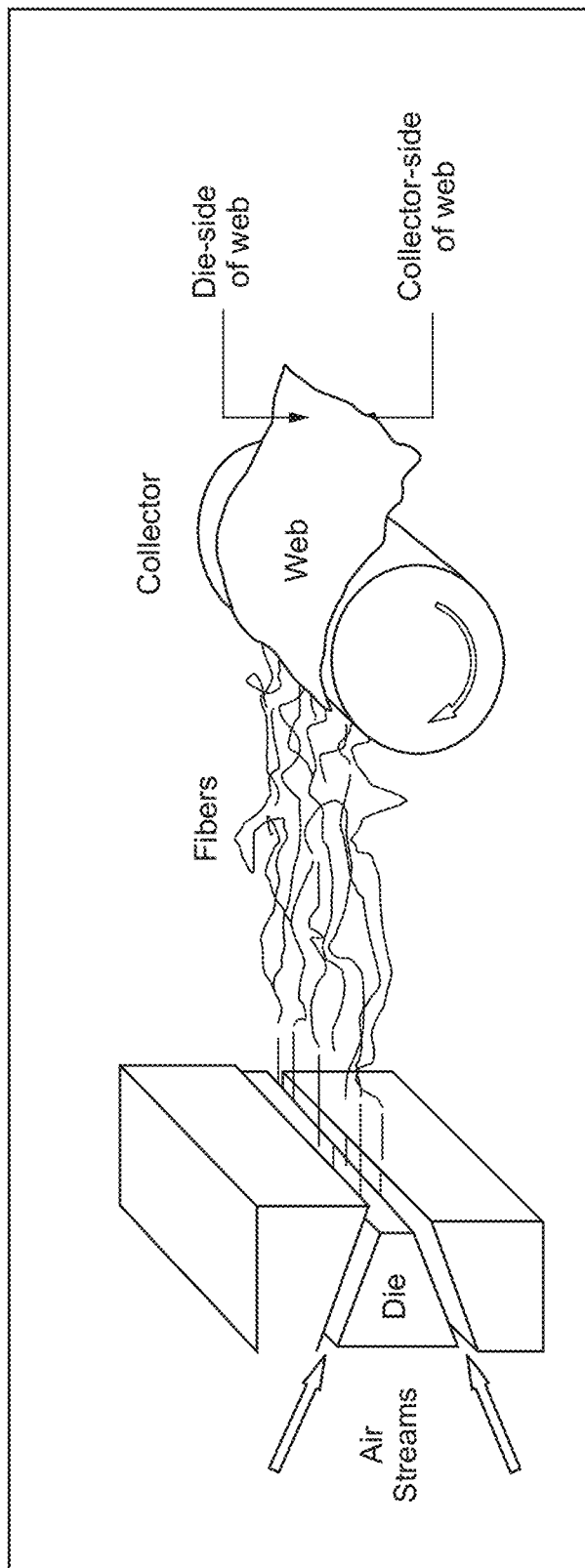

FIG. 1 illustrates an exemplary technique wherein a 2 phase propellant gas spinning process may be used for making the nanofiber. FIG. 2 illustrates a general melt blowing technique.

In particular, disclosed herein is an embodiment wherein a method of making a nanofiber nonwoven product wherein the nonwoven fabric is melt-spun by way of melt-blowing through a spinneret into a high velocity gaseous stream. More particularly, in one embodiment, the nonwoven fabric is melt-spun by 2-phase propellant-gas spinning, including extruding the polyamide composition in liquid form with pressurized gas through a fiber-forming channel.

Definitions and Test Methods

Terminology used herein is given its ordinary meaning consistent with the definitions set forth below.

Spinning, as used herein, refers to the steps of melting a polyamide composition and forming the polyamide composition into fibers. Examples of spinning include centrifugal spinning, melt blowing, spinning through a spinneret (e.g., a spinneret without a charge) or die, and "island-in-the sea" geometry.

GSM refers to basis weight in grams per square meter ($g/m^2$), RV refers to Relative Viscosity.

Percentages and parts per million (ppm) refer to weight percent or parts per million by weight based on the weight of the respective composition unless otherwise indicated.

Some typical definitions and test methods are further recited in US Pub. Nos. 2015/0107457 and 2015/0111019, which are incorporated herein by reference. The term "nanofiber nonwoven product" for example, refers to a web of a multitude of essentially randomly oriented nanofibers where no overall repeating structure can be discerned by the naked eye in the arrangement of nanofibers. The nanofibers can be bonded to each other and/or entangled to impart strength and integrity to the web. In some cases the nanofibers are not bonded to one another and may or may not be entangled. The nanofibers can be staple nanofibers or continuous nanofibers, and can comprise a single material or a multitude of materials, either as a combination of different nanofibers or as a combination of similar nanofibers each comprising of different materials. The nanofiber nonwoven product is constructed predominantly of nanofibers. "Predominantly" means that greater than 50% of the fibers in the web are nanofibers. The term "nanofiber" refers to fibers having a number average diameter less than 1000 nm (1 micron). In the case of nonround cross-sectional nanofibers, the term "diameter" as used herein refers to the greatest cross-sectional dimension.

To the extent not indicated otherwise, test methods for determining average fiber diameters, are as indicated in Hassan et al., J 20 Membrane Sci., 427, 336-344, 2013, unless otherwise specified.

Basis Weight may be determined by ASTM D-3776 and reported in GSM ($g/m^2$).

"Consisting essentially of" refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

Air permeability is measured using an Air Permeability Tester, available from Precision Instrument Company, Hagerstown, Md. Air permeability is defined as the flow rate of air at 23±1° C. through a sheet of material under a specified pressure head. It is usually expressed as cubic feet per minute per square foot at 0.50 in. (12.7 mm) water pressure, in $cm^3$ per second per square cm or in units of elapsed time for a given volume per unit area of sheet. The instrument referred to above is capable of measuring permeability from 0 to approximately 5000 cubic feet per minute per square foot of test area. For purposes of comparing permeability, it is convenient to express values normalized to 5 GSM basis weight. This is done by measuring Air Permeability Value and basis weight of a sample (@ 0.5" H2O typically), then multiplying the actual Air Permeability Value by the ratio of actual basis weight in GSM to 5. For example, if a sample of 15 GSM basis weight has a Value of 10 $CFM/ft^2$, its Normalized 5 GSM Air Permeability Value is 30 $CFM/ft^2$.

Polyamide

As used herein, polyamide composition and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 66, 30 wt. % polyethylene, and 30 wt. % polypropylene is also referred to herein as a polyamide since the nylon 6 and nylon 66 components, in total are the components present in the greatest amount.

Exemplary polyamides and polyamide compositions are described in Kirk-Othmer, Encyclopedia of Chemical Technology, Vol. 18, pp. 328-371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides also are formed by addition polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides, specifically nylons, in commercial applications. Nylons are generally chemical and temperature resistant, resulting in superior performance to other particles. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en US/assets/downloads/knowledg e %20center/HTN-whitepaper-R8.pdf available online Jun. 10, 2016. Such polyamides typically include one or more of the structures seen in the following:

olefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polybutylene terephthalate (PBT), polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy

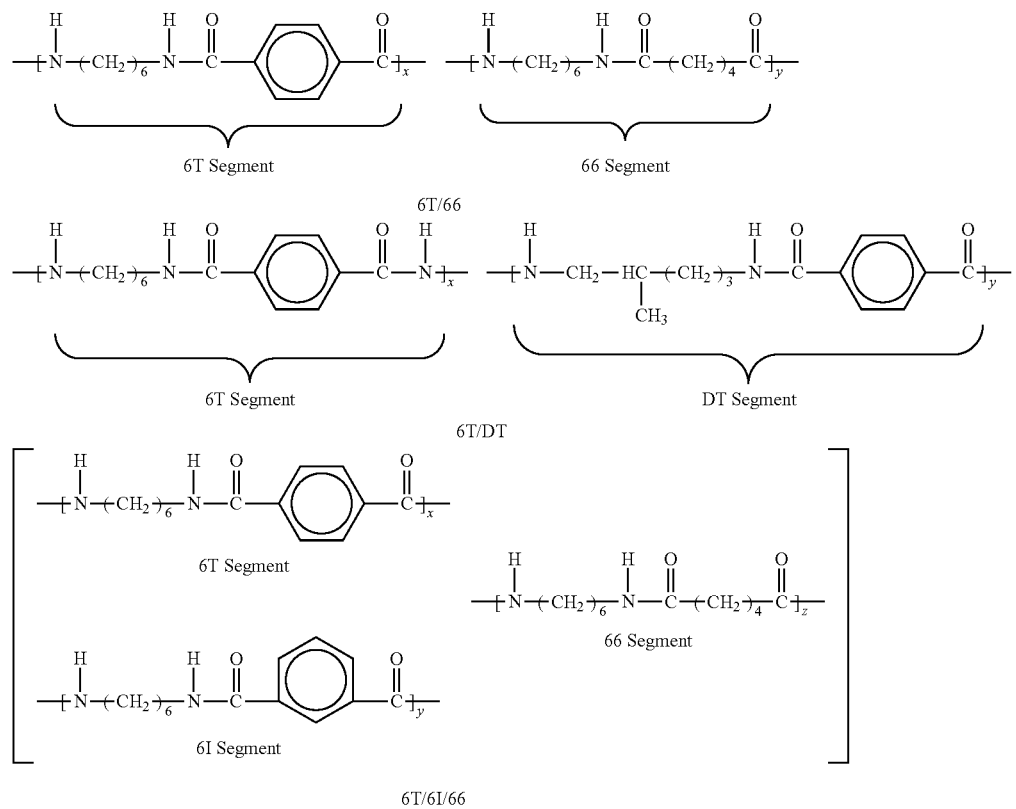

Non-limiting examples of polymers included in the polyamides include polyamides, polypropylene and copolymers, polyethylene and copolymers, polyesters, polystyrenes, polyurethanes, and combinations thereof. Thermoplastic polymers and biodegradable polymers are also suitable for melt blowing or melt spinning into nanofibers of the present disclosure. As discussed herein, the polymers may be melt spun or melt blown, with a preference for melt spinning or melt blowing by 2-phase propellant-gas spinning, including extruding the polyamide composition in liquid form with pressurized gas through a fiber-forming channel.

Melt points of nylon nanofiber products described herein, including copolymers and terpolymers, may be between 223° C. and 390° C., e.g., from 223 to 380, or from 225° C. to 350° C. Additionally, the melt point may be greater than that of conventional nylon 66 melt points depending on any additional polymer materials that are added.

Other polymer materials that can be used in the polyamide nanofiber nonwovens of the disclosure include both addition polymer and condensation polymer materials such as poly- (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 66-6,10 material is a nylon manufactured from hexamethylene diamine and a C6 and a C10 blend of diacids. A nylon 6-66-6,10 is a nylon manufactured by copolymerization of epsilonaminocaproic acid, hexamethylene diamine and a blend of a C6 and a C10 diacid material.

In some embodiments, such as that described in U.S. Pat. No. 5,913,993, a small amount of polyethylene polymer can be blended with a nylon compound used to form a nanofiber nonwoven fabric with desirable characteristics. The addition of polyethylene to nylon enhances specific properties such as softness. The use of polyethylene also lowers cost of production, and eases further downstream processing such as bonding to other fabrics or itself. The improved fabric can be made by adding a small amount of polyethylene to the nylon feed material used in producing a nanofiber melt blown fabric. More specifically, the fabric can be produced by forming a blend of polyethylene and nylon 66, extruding the blend in the form of a plurality of continuous filaments, directing the filaments through a die to melt blow the filaments, depositing the filaments onto a collection surface such that a web is formed.

The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 and the density is about 0.93.

The polyethylene used in the process of this embodiment of the subject disclosure can be added at a concentration of about 0.05% to about 20%. In a preferred embodiment, the concentration of polyethylene will be between about 0.1% and about 1.2%. Most preferably, the polyethylene will be present at about 0.5%. The concentration of polyethylene in the fabric produced according to the method described will be approximately equal to the percentage of polyethylene added during the manufacturing process. Thus, the percentage of polyethylene in the fabrics of this embodiment of the subject disclosure will typically range from about 0.05% to about 20% and will preferably be about 0.5%. Therefore, the fabric will typically comprise between about 80 and about 99.95 percent by weight of nylon. The filament extrusion step can be carried out between about 250° C. and about 325° C. Preferably, the temperature range is about 280° C. to about 315° C. but may be lower if nylon 6 is used.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line. The blend or copolymer can also be produced by introducing the appropriate mixture into a continuous polymerization spinning system.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 6I. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant disclosure as one method of making nanofibers.

There is a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

RV of Polyamide and of Nanofiber Nonwoven Product

RV of polyamides (and resultant products) is generally a ratio of solution or solvent viscosities measured in a capillary viscometer at 25° C. (ASTM D 789) (2015). For present purposes the solvent is formic acid containing 10% by weight water and 90% by weight formic acid. The solution is 8.4% by weight polymer dissolved in the solvent.

The RV ($\eta_r$) as used with respect to the disclosed polymers and products is the ratio of the absolute viscosity of the polymer solution to that of the formic acid:

$$\eta_r = (\eta_p/\eta_f) = (f_r \times d_p \times t_p)/\eta_f$$

where: $d_p$=density of formic acid-polymer solution at 25° C., $t_p$=average efflux time for formic acid-polymer solution, $\eta_f$=absolute viscosity of formic acid, kPa×s (E+6 cP) and $f_r$=viscometer tube factor, mm²/s (cSt)/s=$\eta_s/t_3$.

A typical calculation for a 50 RV specimen:

$$\eta r = (fr \times dp \times tp)/\eta f$$

where:
fr=viscometer tube factor, typically 0.485675 cSt/s
dp=density of the polymer—formic solution, typically 1.1900 g/ml tp=average efflux time for polymer—formic solution, typically 135.00 s
$\eta$f=absolute viscosity of formic acid, typically 1.56 cP giving an RV of $\eta$r=(0.485675 cSt/s×1.1900 g/ml×135.00 s)/1.56 cP=50.0. The term $t_3$ is the efflux time of the S-3 calibration oil used in the determination of the absolute viscosity of the formic acid as required in ASTM D789 (2015).

In some embodiments, the RV of the (precursor) polyamide has a lower limit of at least 2, e.g., at least 3, at least 4, or at least 5. In terms of upper limits, the polyamide has an RV of at 330 or less, 300 or less, 275 or less, 250 or less, 225 or less, 200 or less, 150 or less, 100 or less, or 60 or less. In terms of ranges, the polyamide may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40 and any values in between.

In some embodiments, the RV of the nanofiber nonwoven product has a lower limit of at least 2, e.g., at least 3, at least 4, or at least 5. In terms of upper limits, the nanofiber nonwoven product has an RV of at 330 or less, 300 or less, 275 or less, 250 or less, 225 or less, 200 or less, 150 or less, 100 or less, or 60 or less. In terms of ranges, the nanofiber nonwoven product may have an RV of 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40, and any values in between.

The relationship between the RV of the (precursor) polyamide composition and the RV of the nanofiber nonwoven product may vary. In some aspects, the RV of the nanofiber nonwoven product may be lower than the RV of the polyamide composition. Reducing the RV conventionally has not been a desirable practice when spinning nylon 66. The inventors, however, have discovered that, in the production of nanofibers, it is an advantage. It has been found that the use of lower RV polyamide nylons, e.g., lower RV nylon 66, in a melt spinning process has surprisingly been found to yield nanofiber filaments having unexpectedly small filament diameters.

The method by which the RV is lowered may vary widely. In some cases, process temperature may be raised to lower the RV. In some embodiments, however, the temperature raise may only slightly lower the RV since temperature affects the kinetics of the reaction, but not the reaction equilibrium constant. The inventors have discovered that, beneficially, the RV of the polyamide, e.g., the nylon 66, may be lowered by depolymerizing the polymer with the addition of moisture. Up to 5% moisture, e.g., up to 4%, up to 3%, up to 2%, or up to 1%, may be included before the polyamide begins to hydrolyze. This technique provides a surprising advantage over the conventional method of adding other polymers, e.g., polypropylene, to the polyamide (to reduce RV).

In some aspects, the RV may be raised, e.g., by lowering the temperature and/or by reducing the moisture. Again, temperature has a relatively modest effect on adjusting the RV, as compared to moisture content. The moisture content may be reduced to as low as 1 ppm or greater, e.g., 5 ppm or greater, 10 ppm or greater, 100 ppm or greater, 500 ppm or greater, 1000 ppm or greater, or 2500 ppm or greater. Reduction of moisture content is also advantageous for decreasing TDI and ODI values, discussed further herein. Inclusion of a catalyst may affect the kinetics, but not the actual K value.

In some aspects, the RV of the nanofiber nonwoven product is at least 20% less than the RV of the polyamide prior to spinning, e.g., at least 25% less, at least 30% less, at least 35% less, at least 40% less, at least 45% less, or at least 90% less.

In other aspects, the RV of the nanofiber nonwoven product is at least 5% greater than the RV of the polyamide prior to spinning, e.g., at least 10% greater, at least 15% greater, at least 20% greater, at least 25% greater, at least 30% greater, or at least 35% greater.

In still further aspects, the RV of the polyamide and the RV of the nanofiber nonwoven product may be substantially the same, e.g., within 5% of each other.

An additional embodiment of the present disclosure involves production of a layer of filter media comprising polyamide nanofibers having an average fiber diameter of less than 1 micron, and having an RV of from 2 to 330. In this alternate embodiment, preferable RV ranges include: 2 to 330, e.g., from 2 to 300, from 2 to 275, from 2 to 250, from 2 to 225, from 2 to 200, 2 to 100, from 2 to 60, from 2 to 50, from 2 to 40, from 10 to 40, or from 15 to 40. The nanofibers are subsequently converted to nonwoven web. As the RV increases beyond about 20 to 30, operating temperature becomes a greater parameter to consider. At an RV above the range of about 20 to 30, the temperature must be carefully controlled so as the polymer melts for processing purposes. Methods or examples of melt techniques are described in U.S. Pat. No. 8,777,599 (incorporated by reference herein), as well as heating and cooling sources which may be used in the apparatuses to independently control the temperature of the fiber producing device. Non limiting examples include resistance heaters, radiant heaters, cold gas or heated gas (air or nitrogen), or conductive, convective, or radiation heat transfer mechanisms.

Fiber Dimensions and Distributions

The fibers disclosed herein are nanofibers, e.g., fibers having an average fiber diameter of less than 1000 nm.

In the case of polyamides having an RV above 2 and less than 330, the average fiber diameter of the nanofibers in the fiber layer of the nonwoven may be less than 1 micron, e.g., less than 950 nanometers, less than 925 nanometers, less than 900 nanometers, less than 800 nanometers, less than 700 nanometers, less than 600 nanometers, or less than 500 nanometers. In terms of lower limits, the average fiber diameter of the nanofibers in the fiber layer of the nonwoven may have an average fiber diameter of at least 100 nanometers, at least 110 nanometers, at least 115 nanometers, at least 120 nanometers, at least 125 nanometers, at least 130 nanometers, or at least 150 nanometers. In terms of ranges, the average fiber diameter of the nanofibers in the fiber layer of the nonwoven may be from 100 to 1000 nanometers, e.g., from 110 to 950 nanometers, from 115 to 925 nanometers, from 120 to 900 nanometers, from 125 to 800 nanometers, from 125 to 700 nanometers, from 130 to 600 nanometers, or from 150 to 500 nanometers. Such average fiber diameters differentiate the nanofibers formed by the spinning processes disclosed herein from nanofibers formed by electrospinning processes. Electrospinning processes typically have average fiber diameters of less than 100 nanometers, e.g., from 50 up to less than 100 nanometers. Without being bound by theory, it is believed that such small nanofiber diameters may result in reduced strength of the fibers and increased difficulty in handling the nanofibers.

The use of the disclosed process and precursors leads to a specific and beneficial distribution of fiber diameters. For example, less than 20% of the nanofibers may have a fiber diameter from greater than 700 nanometers, e.g., less than 17.5%, less than 15%, less than 12.5%, or less than 10%. In terms of lower limits, at least 1% of the nanofibers have a fiber diameter of greater than 700 nanometers, e.g., at least 2%, at least 3%, at least 4%, or at least 5%. In terms of ranges, from 1 to 20% of the nanofibers have a fiber diameter of greater than 700 nanometers, e.g., from 2 to 17.5%, from 3 to 15%, from 4 to 12.5%, or from 5 to 10%. Such a distribution differentiates the nanofiber nonwoven products described herein from those formed by electrospinning (which have a smaller average diameter (50-100 nanometers) and a much narrower distribution) and from those formed by non-nanofiber melt spinning (which have a much greater distribution). For example, a non-nanofiber centrifugally spun nonwoven is disclosed in WO 2017/214085 and reports fiber diameters of 2.08 to 4.4 microns but with a very broad distribution reported in FIG. 10A of WO 2017/214085.

In an embodiment, advantages are envisioned having two related polymers with different RV values (both less than 330 and having an average fiber diameter less than 1 micron) blended for a desired property. For example, the melting point of the polyamide may be increased, the RV adjusted, or other properties adjusted.

In some embodiments, the resultant nanofibers contain small amounts, if any, of solvent. Accordingly, in some aspects, the resultant nanofibers are free of solvent. It is believed that the use of the melt spinning process advantageously reduces or eliminates the need for solvents. This reduction/elimination leads to beneficial effects such as environmental friendliness and reduced costs. Fibers formed via solution spinning processes, which are entirely different from melt spinning processes described herein, require such solvents. In some embodiments, the nanofibers comprise less than 1 wt. % solvent, less than 5000 ppm, less than 2500 ppm, less than 2000 ppm, less than 1500 ppm, less than 1000 ppm, less than 500 ppm, less than 400 ppm, less than 300 ppm, less than 200 ppm, less than 100 ppm, or less than a detectable amount of solvent. Solvents may vary depending on the components of the polyamide but may include formic acid, sulfuric acid, toluene, benzene, chlorobenzene, xylene/chlorohexanone, decalin, paraffin oil, ortho dichlorobenzene, and other known solvents. In terms of ranges, when small amounts of solvent are included, the resultant nanofibers may have at least 1 ppm, at least 5 ppm, at least 10 ppm, at least 15 ppm, or at least 20 ppm solvent. In some aspects, non-volatile solvents, such as formic acid, may remain in the product and may require an additional extraction step. Such an additional extraction step may add to production costs.

In some cases, the nanofiber may be made of a polyamide material that optionally includes an additive. Examples of suitable additives include oils (such as finishing oils, e.g., silicone oils), waxes, solvents (including formic acid as described herein), lubricants (e.g., paraffin oils, amide waxes, and stearates), stabilizers (e.g., photostabilizers, UV stabilizers, etc.), delusterants, antioxidants, colorants, pigments, and dyes. The additives may be present in a total amount of up to 49 wt. % of the nanofiber nonwoven product, e.g., up to 40 wt. %, up to 30 wt. %, up to 20 wt. %, up to 10 wt. %, up to 5 wt. %, up to 3 wt. %, or up to 1 wt. %. In terms of lower limits, the additives may be present in the nanofiber product in an amount of at least 0.01 wt. %, e.g., at least 0.05 wt. %, at least 0.1 wt. %, at least 0.25 wt. %, or at least 0.5 wt. %. In terms of ranges, the additives may be present in the nanofiber product in an amount from 0.01 to 49 wt. %, e.g., from 0.05 to 40 wt. %, from 0.1 to 30 wt. %, from 0.25 to 20 wt. %, from 0.5 to 10 wt. %, from 0.5 to 5 wt. %, or from 0.5 to 1 wt. %. In some aspects, monomers and/or polymers may be included as additives. For example, nylon 6I and/or nylon 6T may be added as an additive.

Antioxidants suitable for use in conjunction with the nanofiber nonwoven product described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, ubiquinol, gallic acids, melatonin, secondary aromatic amines, benzofuranones, hindered phenols, polyphenols, hindered amines, organophosphorus compounds, thioesters, benzoates, lactones, hydroxylamines, and the like, and any combination thereof. In some embodiments, the antioxidant may be selected from the group consisting of stearyl 3-(3,5-di-tert-butyl-4-hydroxyphenyl) propionate, bis(2,4-dicumylphenyl)pentaerythritol diphosphite, tris(2,4-di-tert-butylphenyl)phosphite, bisphenol A propoxylate diglycidyl ether, 9,10-dihydroxy-9-oxa-10-phosphaphenanthrene-10-oxide and mixtures thereof.

Colorants, pigments, and dyes suitable for use in conjunction with the nanofiber nonwoven product described herein may, in some embodiments, include, but are not limited to, plant dyes, vegetable dyes, titanium dioxide (which may also act as a delusterant), carbon black, charcoal, silicon dioxide, tartrazine, E102, phthalocyanine blue, phthalocyanine green, quinacridones, perylene tetracarboxylic acid di-imides, dioxazines, perinones disazo pigments, anthraquinone pigments, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, solvent dyes may be employed.

Method of Forming the Nanofibers

As described herein, the nanofiber nonwoven product is formed by spinning to form a spun product. "Island-in-the-sea" refers to fibers forming by extruding at least two polymer components from one spinning die, also referred to as conjugate spinning. As used herein, spinning specifically excludes solution spinning and electrospinning.

In some aspects, the polyamide nanofiber is melt blown. Melt blowing is advantageously less expensive than electrospinning. Melt blowing is a process type developed for the formation of nanofibers and nonwoven webs; the nanofibers are formed by extruding a molten thermoplastic polymeric material, or polyamide, through a plurality of small holes. The resulting molten threads or filaments pass into converging high velocity gas streams which attenuate or draw the filaments of molten polyamide to reduce their diameters. Thereafter, the melt blown nanofibers are carried by the high velocity gas stream and deposited on a collecting surface, or forming wire, to form a nonwoven web of randomly disbursed melt blown nanofibers. The formation of nanofibers and nonwoven webs by melt blowing is well known in the art. See, by way of example, U.S. Pat. Nos. 3,016,599; 3,704,198; 3,755,527; 3,849,241; 3,978,185; 4,100,324; 4,118,531; and 4,663,220.

As is well known, electrospinning has many fabrication parameters that may limit spinning certain materials. These parameters include: electrical charge of the spinning material and the spinning material solution; solution delivery (often a stream of material ejected from a syringe); charge at the jet; electrical discharge of the fibrous membrane at the collector; external forces from the electrical field on the spinning jet; density of expelled jet; and (high) voltage of the electrodes and geometry of the collector. In contrast, the aforementioned nanofibers and products are advantageously formed without the use of an applied electrical field as the primary expulsion force, as is required in an electrospinning process. Thus, the polyamide is not electrically charged, nor are any components of the spinning process. Importantly, the dangerous high voltage necessary in electrospinning processes, is not required with the presently disclosed processes/products. In some embodiments, the process is a non-electrospin process and resultant product is a non-electrospun product that is produced via a non-electrospin process.

An embodiment of making the inventive nanofiber nonwovens is by way of 2-phase spinning or melt blowing with propellant gas through a spinning channel as is described generally in U.S. Pat. No. 8,668,854. This process includes two phase flow of polymer or polymer solution and a pressurized propellant gas (typically air) to a thin, preferably converging channel. The channel is usually and preferably annular in configuration. It is believed that the polymer is sheared by gas flow within the thin, preferably converging channel, creating polymeric film layers on both sides of the channel. These polymeric film layers are further sheared into nanofibers by the propellant gas flow. Here again, a moving collector belt may be used and the basis weight of the nanofiber nonwoven is controlled by regulating the speed of the belt. The distance of the collector may also be used to control fineness of the nanofiber nonwoven. The process is better understood with reference to FIG. 1.

Beneficially, the use of the aforementioned polyamide precursor in the melt spinning process provides for significant benefits in production rate, e.g., at least 5% greater, at least 10% greater, at least 20% greater, at least 30% greater, at least 40% greater. The improvements may be observed as an improvement in area per hour versus a conventional process, e.g., an electrospin process or a process that does not employ the features described herein. In some cases, the production increase over a consistent period of time is improved. For example, over a given time period, e.g., one hour, of production, the disclosed process produces at least 5% more product than a conventional process or an electrospin process, e.g., at least 10% more, at least 20% more, at least 30% more, or at least 40% more.

FIG. 1 illustrates schematically operation of a system for spinning a nanofiber nonwoven including a polyamide feed assembly 110, an air feed 1210 a spinning cylinder 130, a collector belt 140 and a take up reel 150. During operation, polyamide melt or solution is fed to spinning cylinder 130 where it flows through a thin channel in the cylinder with high pressure air, shearing the polyamide into nanofibers. Details are provided in the aforementioned U.S. Pat. No. 8,668,854. The throughput rate and basis weight is controlled by the speed of the belt. Optionally, functional additives such as charcoals, copper or the like can be added with the air feed, if so desired.

In an alternate construction of the spinneret used in the system of FIG. 1, particulate material may be added with a separate inlet as is seen in U.S. Pat. No. 8,808,594.

Still yet another methodology which may be employed is melt blowing the polyamide nanofiber webs disclosed herein (FIG. 2). Melt blowing involves extruding the polyamide into a relatively high velocity, typically hot, gas stream. To produce suitable nanofibers, careful selection of the orifice and capillary geometry as well as the temperature is required as is seen in: Hassan et al., J Membrane Sci., 427, 336-344, 2013 and Ellison et al., Polymer, 48 (11), 3306-3316, 2007, and, International Nonwoven Journal, Summer 2003, pg 21-28.

U.S. Pat. No. 7,300,272 discloses a fiber extrusion pack for extruding molten material to form an array of nanofibers that includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly. This pack can be used to make nanofibers with a melt blowing system described in the patents previously mentioned.

Additional Product Characteristics

The spinning processes described herein can form a polyamide nanofiber nonwoven product having a relatively low oxidative degradation index ("ODI") value. A lower ODI indicates less severe oxidative degradation during manufacture. In some aspects, the ODI may range from 10 to 150 ppm. ODI may be measured using gel permeation chromatography (GPC) with a fluorescence detector. The instrument is calibrated with a quinine external standard. 0.1 grams of nylon is dissolved in 10 mL of 90% formic acid. The solution is then analyzed by GPC with the fluorescence detector. The detector wavelengths for ODI are 340 nm for excitation and 415 nm for emission. In terms of upper limits, the ODI of the polyamide nanofiber nonwoven may be 200 ppm or less, e.g., 180 ppm or less, 150 ppm or less, 125 ppm or less, 100 ppm or less, 75 ppm or less, 60 ppm or less, or 50 ppm or less. In terms of the lower limits, the ODI of the polyamide nanofiber nonwoven may be 1 ppm or greater, 5 ppm or greater, 10 ppm or greater, 15 ppm or greater, 20 ppm or greater, or 25 ppm or greater. In terms of ranges, the ODI of the polyamide nanofiber nonwoven may be from 1 to 200 ppm, from 1 to 180 ppm, from 1 to 150 ppm, from 5 to 125 ppm, from 10 to 100 ppm, from 1 to 75 ppm, from 5 to 60 ppm, or from 5 to 50 ppm.

Additionally, the spinning processes as described herein can result in a relatively low thermal degradation index ("TDI"). A lower TDI indicates a less severe thermal history of the polyamide during manufacture. TDI is measured the same as ODI, except that the detector wavelengths for TDI are 300 nm for excitation and 338 nm for emission. In terms of upper limits, the TDI of the polyamide nanofiber nonwoven may be 4000 ppm or less, e.g., 3500 ppm or less, 3100 ppm or less, 2500 ppm or less, 2000 ppm or less, 1000 ppm or less, 750 ppm or less, or 700 ppm or less. In terms of the lower limits, the TDI of the polyamide nanofiber nonwoven may be 20 ppm or greater, 100 ppm or greater, 125 ppm or greater, 150 ppm or greater, 175 ppm or greater, 200 ppm or greater, or 210 ppm or greater. In terms of ranges, the TDI of the polyamide nanofiber nonwoven may be from 20 to 400 ppm, 100 to 4000 ppm, from 125 to 3500 ppm, from 150 to 3100 ppm, from 175 to 2500 ppm, from 200 to 2000 ppm, from 210 to 1000 ppm, from 200 to 750 ppm, or from 200 to 700 ppm.

TDI and ODI test methods are also disclosed in U.S. Pat. No. 5,411,710. Lower TDI and/or ODI values are beneficial because they indicate that the nanofiber nonwoven product is more durable than products having greater TDI and/or ODI. As explained above, TDI and ODI are measures of degradation and a product with greater degradation would not perform as well. For example, such a product may have reduced dye uptake, lower heat stability, lower life in a filtration application where the fibers are exposed to heat, pressure, oxygen, or any combination of these, and lower tenacity in industrial fiber applications.

One possible method that may be used in forming a nanofiber nonwoven product with a lower TDI and/or ODI would be to include additives as described herein, especially antioxidants. Such antioxidants, although not necessary in conventional processes, may be used to inhibit degradation. An example of useful antioxidants include copper halides and Nylostab® S-EED® available from Clariant.

The spinning methods as described herein may also result in a nanofiber nonwoven product having an Air Permeability Value of less than 600 CFM/ft$^2$, e.g., less than 590 CFM/ft$^2$, less than 580 CFM/ft$^2$, less than 570 CFM/ft$^2$, less than 560 CFM/ft$^2$, or less than 550 CFM/ft$^2$. In terms of lower limits, the nanofiber nonwoven product may have an Air Permeability Value of at least 50 CFM/ft$^2$, at least 75 CFM/ft$^2$, at least 100 CFM/ft$^2$, at least 125 CFM/ft$^2$, at least 150 CFM/ft$^2$, or at least 200 CFM/ft$^2$. In terms of ranges, the nanofiber nonwoven product may have an Air Permeability Value from 50 to 600 CFM/ft$^2$, from 75 to 590 CFM/ft$^2$, from 100 to 580 CFM/ft$^2$, from 125 to 570 CFM/ft$^2$, from 150 to 560 CFM/ft$^2$, or from 200 to 550 CFM/ft$^2$.

The spinning methods as described herein may also result in a nanofiber nonwoven product having a filtration efficiency, as measured by a TSI 3160 automated filter tester from 1 to 99.999%, e.g., from 1 to 95%, from 1 to 90%, from 1.5 to 85%, or from 2 to 80%. The TSI 3160 Automated Filter Tester is used to test the efficiency of filter materials. Particle penetration and pressure drop are the two important parameters measured using this instrument. Efficiency is 100%—penetration. A challenge solution with known particle size is used. The TSI 3160 is used to measure Hepa filters and uses a DOP solution. It combines an Electrostatic Classifier with dual Condensation Particle Counters (CPCs) to measure most penetrating particle size (MPPS) from 15 to 800 nm using monodisperse particles. And can test efficiencies up to 99.999999%.

Applications

The inventive nanofiber nonwovens are useful in a variety of applications due to their high temperature resistance, barrier, permeability properties, and, processability. The products may be used in multilayer structures including laminates in many cases.

Thus, the products are used in air or liquid filtration in the following sectors: transportation; industrial; commercial and residential.

The products are likewise suitable for barrier applications in breathable fabrics, surgical nonwovens, baby care, adult care, apparel, composites, construction and acoustics. The compositions are useful for sound dampening in automotive, electronic and aircraft applications which may require composites of different fiber sizes for best performance. At higher basis weights, the products are used in connection with beverages, food packaging, transportation, chemical processing and medical applications such as wound dressings or medical implants.

The unique characteristics of the nonwovens of the disclosure provide functionality and benefits not seen in conventional products, for example, the nonwovens of the disclosure can be used as packaging for smoked meats.

EMBODIMENTS

Embodiment 1

A nanofiber nonwoven product comprising polyamide nanofibers, wherein the product has a relative viscosity from 2 to 330, and wherein the nanofibers have an average diameter from 100 to 1000 nanometers.

Embodiment 2

The nanofiber nonwoven product according to Embodiment 1, wherein the melt point of the product is 225° C. or greater.

Embodiment 3

The nanofiber nonwoven product according to Embodiment 1 or 2, wherein no more than 20% of the nanofibers have a diameter of greater than 700 nanometers.

Embodiment 4

The nanofiber nonwoven product according to any of Embodiments 1-3, wherein the polyamide comprises nylon 66 or nylon 6/66.

Embodiment 5

The nanofiber nonwoven product according to any of Embodiments 1-4, wherein the polyamide is a high temperature nylon.

Embodiment 6

The nanofiber nonwoven product according to any of Embodiments 1-5, wherein the polyamide comprises N6, N66, N6T/66, N612, N6/66, N6I/66, N66/6I/6T, N11, and/or N12, wherein "N" means Nylon.

Embodiment 7

The nanofiber nonwoven product according to any of Embodiments 1-6, wherein the product has an Air Permeability Value of less than 600 CFM/ft$^2$.

Embodiment 8

The nanofiber nonwoven product according to any of Embodiments 1-7, wherein the product has a basis weight of 150 GSM or less.

Embodiment 9

The nanofiber nonwoven product according to any of Embodiments 1-8, wherein the product has a TDI of at least 20 ppm.

Embodiment 10

The nanofiber nonwoven product according to any of Embodiments 1-9, wherein the product has an ODI of at least 1 ppm.

Embodiment 11

The nanofiber nonwoven product according to any of Embodiments 1-10, wherein the product is free of solvent.

Embodiment 12

The nanofiber nonwoven product according to any of Embodiments 1-10, wherein the product comprises less than 5000 ppm solvent.

Embodiment 13

The nanofiber nonwoven product according to any of Embodiments 1-12, wherein at least 1% of the nanofibers have a diameter of at least 700 nm.

Embodiment 14

The nanofiber nonwoven product according to any of Embodiments 1-13, wherein the polyamide precursor had a moisture content of at least 5 ppm.

Embodiment 15

The nanofiber nonwoven product according to any of Embodiments 1-14, wherein the polyamide precursor had a moisture content of no more than 3 wt. %.

Embodiment 16

The nanofiber nonwoven product according to any of Embodiments 1-14, wherein the polyamide precursor had an RV from 2 to 330.

Embodiment 17

The nanofiber nonwoven product according to Embodiment 16, wherein the RV of the nanofiber nonwoven product is reduced as compared to the RV of the polyamide precursor.

Embodiment 18

The nanofiber nonwoven product according to Embodiment 16, wherein the RV of the nanofiber nonwoven product stays the same or is increased as compared to the RV of the polyamide precursor.

Embodiment 19

A nanofiber nonwoven product comprising a polyamide which is spun into nanofibers with an average diameter from 100 to 1000 nanometers and formed into said nonwoven product, wherein the polyamide has a relative viscosity from 2 to 330.

Embodiment 20

The nanofiber nonwoven product according to Embodiment 19, wherein the melt point of the product is 225° C. or greater.

Embodiment 21

The nanofiber nonwoven product according to Embodiment 19 or 20, wherein no more than 20% of the nanofibers have a diameter of greater than 700 nanometers.

Embodiment 22

The nanofiber nonwoven product according to any of Embodiments 19-21, wherein the polyamide comprises nylon 66 or nylon 6/66.

Embodiment 23

The nanofiber nonwoven product according to any of Embodiments 19-22, wherein the polyamide is a high temperature nylon.

Embodiment 24

The nanofiber nonwoven product according to an of Embodiments 19-23, wherein the polyamide comprises N6, N66, N6T/66, N612, N6/66, N6I/66, N66/6I/6T, N11, and/or N12, wherein "N" means Nylon.

Embodiment 25

The nanofiber nonwoven product according to any of Embodiments 19-24, wherein the product has an Air Permeability Value of less than 600 CFM/ft$^2$.

Embodiment 26

The nanofiber nonwoven product according to any of Embodiments 19-25, wherein the product has a basis weight of 150 GSM or less.

Embodiment 27

The nanofiber nonwoven product according to any of Embodiments 19-26, wherein the product has a TDI of at least 20 ppm.

Embodiment 28

The nanofiber nonwoven product according to any of Embodiments 19-27, wherein the product has an ODI of at least 1 ppm.

Embodiment 29

The nanofiber nonwoven product according to any of Embodiments 19-28, wherein the product is free of solvent.

Embodiment 30

The nanofiber nonwoven product according to any of Embodiments 19-29, wherein the product comprises less than 5000 ppm solvent.

Embodiment 31

The nanofiber nonwoven product according to any of Embodiments 10-30, wherein at least 1% of the nanofibers have a diameter of at least 700 nm.

Embodiment 32

The nanofiber nonwoven product according to any of Embodiments 19-31, wherein the polyamide has a moisture content of at least 5 ppm.

Embodiment 33

The nanofiber nonwoven product according to any of Embodiments 19-32 wherein the polyamide has a moisture content of no more than 3 wt. %.

Embodiment 34

The nanofiber nonwoven product according to any of Embodiments 19-33 wherein the product has an RV from 2 to 330.

Embodiment 35

The nanofiber nonwoven product according to Embodiment 34, wherein the RV of the nanofiber nonwoven product is reduced as compared to the RV of the polyamide precursor.

Embodiment 36

The nanofiber nonwoven product according to Embodiment 34, wherein the RV of the nanofiber nonwoven product stays the same or is increased as compared to the RV of the polyamide precursor.

Embodiment 37

A method of making a nanofiber nonwoven product, the method comprising: (a) providing a polyamide composition, wherein the polyamide has a relative viscosity from 2 to 330; (b) spinning the polyamide composition into a plurality of nanofibers having an average fiber diameter from 100 to 1000 nanometers; and (c) forming the nanofibers into the nanofiber nonwoven product, wherein the polyamide nanofiber layer has an average nanofiber diameter from 100 to 1000 nanometers and a relative viscosity from 2 to 330.

Embodiment 38

The method of making the nanofiber nonwoven product according to Embodiment 37, wherein the polyamide composition is melt spun by way of melt-blowing through a die into a high velocity gaseous stream.

Embodiment 39

The method of making the nanofiber nonwoven product according to Embodiment 37 or 38, wherein the polyamide composition is melt-spun by 2-phase propellant-gas spinning, including extruding the polyamide composition in liquid form with pressurized gas through a fiber-forming channel.

Embodiment 40

The method of making the nanofiber nonwoven product according to any of Embodiments 37-39, wherein the nanofiber nonwoven product is formed by collecting the nanofibers on a moving belt.

Embodiment 41

The method of making the nanofiber nonwoven product according to any of Embodiments 37-40, wherein the polyamide nanofiber layer has a basis weight of 150 GSM or less.

Embodiment 42

The method of making the nanofiber nonwoven product according to any of Embodiments 37-41, wherein the relative viscosity of the polyamide in the nanofiber nonwoven product is reduced as compared to the polyamide composition prior to spinning and forming the product.

Embodiment 43

The method of making the nanofiber nonwoven product according to any of Embodiments 37-41, wherein the relative viscosity of the polyamide in the nanofiber nonwoven product is the same or increased as compared to the polyamide composition prior to spinning and forming the product.

Embodiment 44

The method of making the nanofiber nonwoven product according to any of Embodiments 37-43, wherein the production rate of the method of steps (a)-(c) is at least 5% greater than an electrospinning or solution spinning production rate.

Embodiment 45

The method of making the nanofiber nonwoven product according to any of Embodiments 37-44, wherein the melt point of the product is 225° C. or greater.

Embodiment 46

The method of making the nanofiber nonwoven product according to any of Embodiments 37-45, wherein no more than 20% of the nanofibers have a diameter of greater than 700 nanometers.

Embodiment 47

The method of making the nanofiber nonwoven product according to any of Embodiments 37-46, wherein the polyamide comprises nylon 66 or nylon 6/66.

Embodiment 48

The method of making the nanofiber nonwoven product according to any of Embodiments 37-47, wherein the polyamide is a high temperature nylon.

Embodiment 49

The method of making the nanofiber nonwoven product according to any of Embodiments, 37-48 wherein the polyamide comprises N6, N66, N6T/66, N612, N6/66, N6I/66, N66/6I/6T, N11, and/or N12, wherein "N" means Nylon.

Embodiment 50

The method of making the nanofiber nonwoven product according to any of Embodiments 37-49, wherein the product has an Air Permeability Value of less than 600 CFM/ft$^2$.

Embodiment 51

The method of making the nanofiber nonwoven product according to any of Embodiments 37-50, wherein the product has a basis weight of 150 GSM or less.

Embodiment 52

The method of making the nanofiber nonwoven product according to any of Embodiments 37-51, wherein the product has a TDI of at least 20 ppm.

Embodiment 53

The method of making the nanofiber nonwoven product according to any of Embodiments 37-52, wherein the product has an ODI of at least 1 ppm.

Embodiment 54

The method of making the nanofiber nonwoven product according to any of Embodiments 37-53, wherein the product is free of solvent.

Embodiment 55

The method of making the nanofiber nonwoven product according to any of Embodiments 37-54, wherein the product comprises less than 5000 ppm solvent.

Embodiment 56

The method of making the nanofiber nonwoven product according to any of Embodiments 37-55, wherein at least 1% of the nanofibers have a diameter of at least 700 nm.

Embodiment 57

The method of making the nanofiber nonwoven product according to any of Embodiments, 37-56 wherein the polyamide precursor had a moisture content of at least 5 ppm.

Embodiment 58

The method of making the nanofiber nonwoven product according to any of Embodiments 37-57, wherein the polyamide precursor had a moisture content of no more than 3 wt. %.

Embodiment 59

The method of making the nanofiber nonwoven product according to any of Embodiments 37-57, wherein the polyamide precursor had a moisture content from 10 ppm to 5 wt. %.

Embodiment 60

A nanofiber nonwoven product comprising a polyamide composition formed into said nonwoven product, wherein the product has at least one of the following: (i) a TDI from 20 to 4000 ppm, (ii) an ODI from 1 to 200 ppm, (iii) an average nanofiber diameter from 100 to 1000 nanometers, (iv) a polyamide comprising nylon 6,6, and (v) a polyamide composition RV from 2 to 330.

Embodiment 61

A nanofiber nonwoven product comprising a nylon 66 polyamide which is melt spun into nanofibers and formed into said nonwoven product, wherein the product has a TDI of at least 20 ppm and an ODI of at least 1 ppm.

Embodiment 62

A nanofiber nonwoven product comprising a nylon 66 polyamide which is melt spun into nanofibers and formed into said nonwoven product, wherein no more than 20% of the nanofibers have a diameter of greater than 700 nanometers.

Embodiment 63

The nanofiber nonwoven product according to any of Embodiments 60-62, wherein the melt point of the product is 225° C. or greater.

Embodiment 64

The nanofiber nonwoven product according to any of Embodiments 60-61 and 63, wherein no more than 20% of the nanofibers have a diameter of greater than 700 nanometers.

Embodiment 65

The nanofiber nonwoven product according to any of Embodiments 60-64, wherein the product has an Air Permeability Value of less than 600 CFM/ft2.

Embodiment 66

The nanofiber nonwoven product according to any of Embodiments 60-65, wherein the product has a basis weight of 150 GSM or less.

Embodiment 67

The nanofiber nonwoven product according to any of Embodiments 62-66, wherein the product has a TDI of at least 20 ppm.

Embodiment 68

The nanofiber nonwoven product according to any of Embodiments 62-67, wherein the product has an ODI of at least 1 ppm.

Embodiment 69

The nanofiber nonwoven product according to any of Embodiments 60-68, wherein the product is free of solvent.

Embodiment 70

The nanofiber nonwoven product according to any of Embodiments 60-68, wherein the product comprises less than 5000 ppm solvent.

Embodiment 71

The nanofiber nonwoven product according to any of Embodiments 60-70, wherein the polyamide has a moisture content of at least 5 ppm.

Embodiment 72

The nanofiber nonwoven product according to any of Embodiments 60-71, wherein the polyamide has a moisture content of no more than 3 wt. %.

Embodiment 73

The nanofiber nonwoven product according to any of Embodiments 60-72, wherein the product has an RV from 2 to 330.

Embodiment 74

The nanofiber nonwoven product according to Embodiment 73, wherein the RV of the nanofiber nonwoven product is reduced as compared to the RV of the polyamide precursor.

Embodiment 75

The nanofiber nonwoven product according to Embodiment 73, wherein the RV of the nanofiber nonwoven product stays the same or is increased as compared to the RV of the polyamide precursor The present disclosure is further understood by the following non-limiting examples.

EXAMPLES

Example 1

Utilizing the (melt) spin procedures and apparatus as described in U.S. Pat. No. 8,668,854 (shown generally in FIG. 1), Nylon 66 polyamide was spun onto a moving drum to produce nonwoven webs. The process employed an extruder with a high compression screw, operating at 20 RPM, with a temperature profile of 245° C., 255° C., 265° C., and 265° C. The (precursor) polyamide temperature was 252° C. and nitrogen was used as the gas. Two nonwoven webs were produced (Samples 1 and 2), each having different basis weights. Sample 2 with the higher basis weight was made by the same process, but the nanofibers were spun onto a scrim. In this instance, the scrim was merely used for adding integrity to the inventive nanofiber web. The polyamide had an RV of 7.3 (before spinning). To ensure the constant viscosity of the low RV polyamide would remain essentially constant, the polyamide was prepared using an excess of about 5% adipic acid.

The nonwoven webs were characterized for average fiber diameter, basis weight, air permeability in accordance with the Hassan et al. article noted above. Water vapor transmission rate was also measured (g/m$^2$/24 hr) according to ASTM E96, Procedure B (2016).

Figure 3:
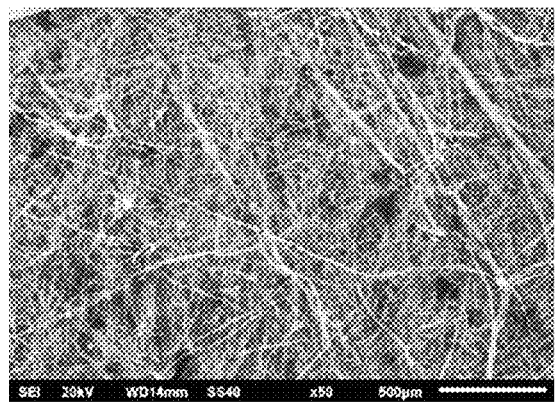
FIG. 3 is a photomicrograph of a nanofiber nylon 66 melt spun into a nonwoven having an RV of 7.3 at a magnification of 50×.
Figure 4:
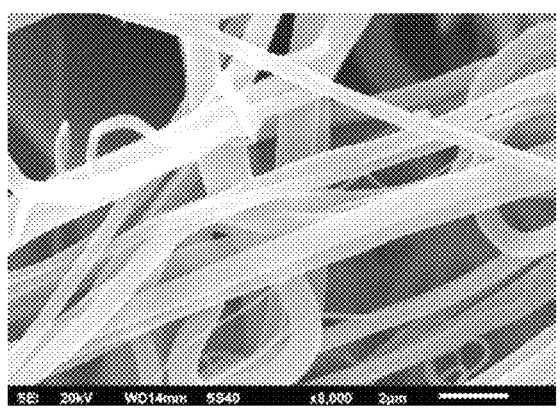
FIG. 4 is a photomicrograph of a nanofiber of a grade from FIG. 3 of nylon 66 melt spun into a nonwoven having an RV of 7.3 at a magnification of 8000×.

The results are shown in Table 1, and the nonwoven mats are shown in the photomicrographs of FIGS. 3 and 4. The nanofibers of the nonwoven mats had an average fiber diameter ranging from 470 nm to 680 nm (575 nm average).

TABLE 1

| | | | Basis | Air | | | | |
| Sample | PA RV | Fiber diameter, nm | weight, GSM | permeability (CFM/ft²) | WVTR g/m²/24 hr | TDI (ppm) | ODI (ppm) | Final RV |
|---|---|---|---|---|---|---|---|---|
| 1 | 7.3 | 680 | 68 | 182.8 | 1140 | 56 | 12 | 10 |
| 2 | 7.3 | 470 | 118 | 182.8 | 1056 | 48 | 8 | 9.9 |

Example 1: Precursor Polyamide and Product Properties

As shown in Table 1, the use of the processes disclosed herein provided for a melt spun nanofiber nonwoven web, the nanofibers of which had a fiber diameter averaging 570 for the RV of 7.3. Air Permeability was about 182.8 CFM/ft2, while water vapor transmission rate averaged about 1100 g/sq meter/24 hrs. Such fiber diameters and performance characteristics have not been achieved using conventional polyamide precursors and/or processes. Without being bound by theory, it is believed that the use of the low RV polyamide composition (and/or nitrogen) was the main reason the TDI and ODI results were so low.

Example 2

Figure 5:
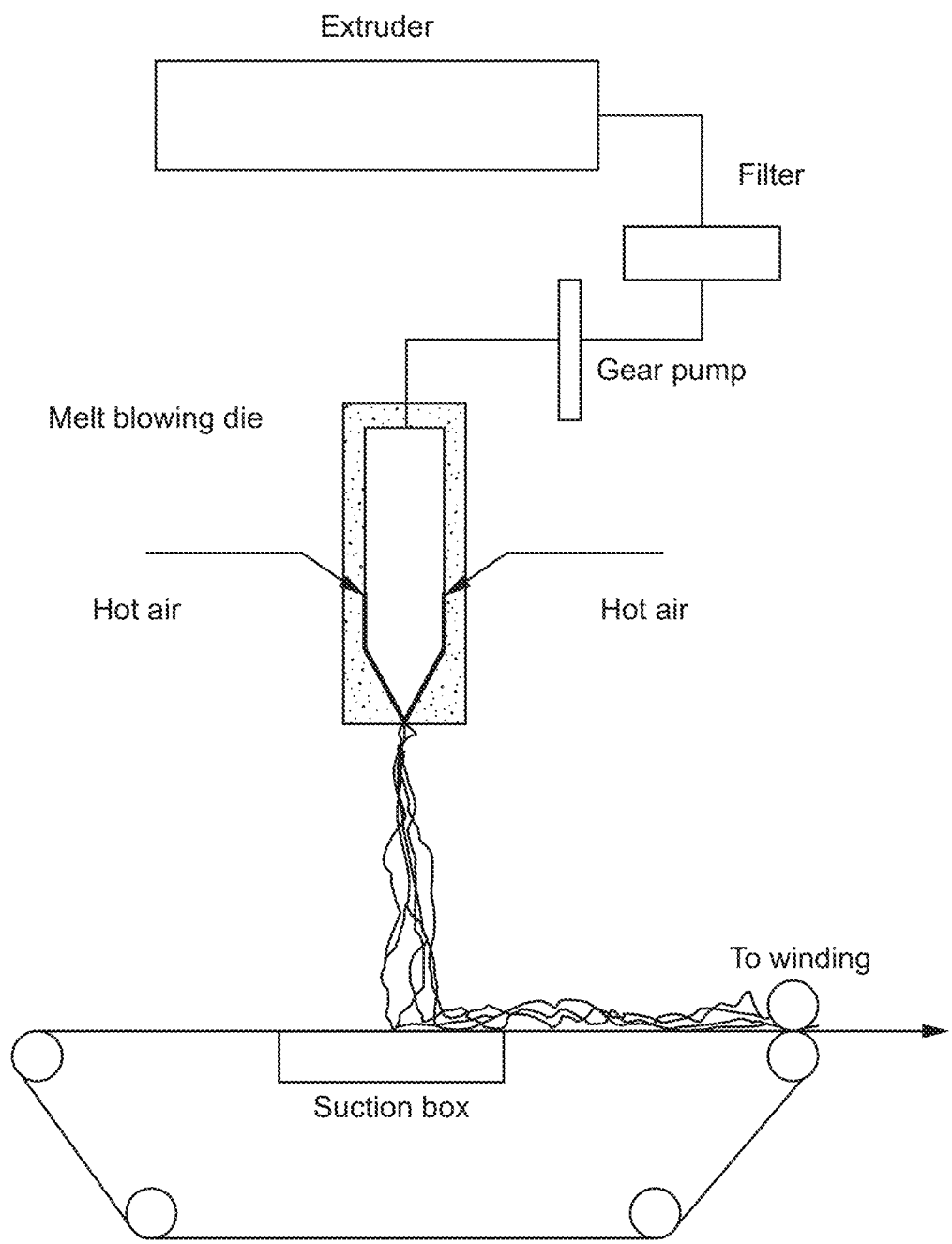
FIG. 5 is a schematic diagram of a melt blowing process in connection with embodiments of the present disclosure.
Figure 6:
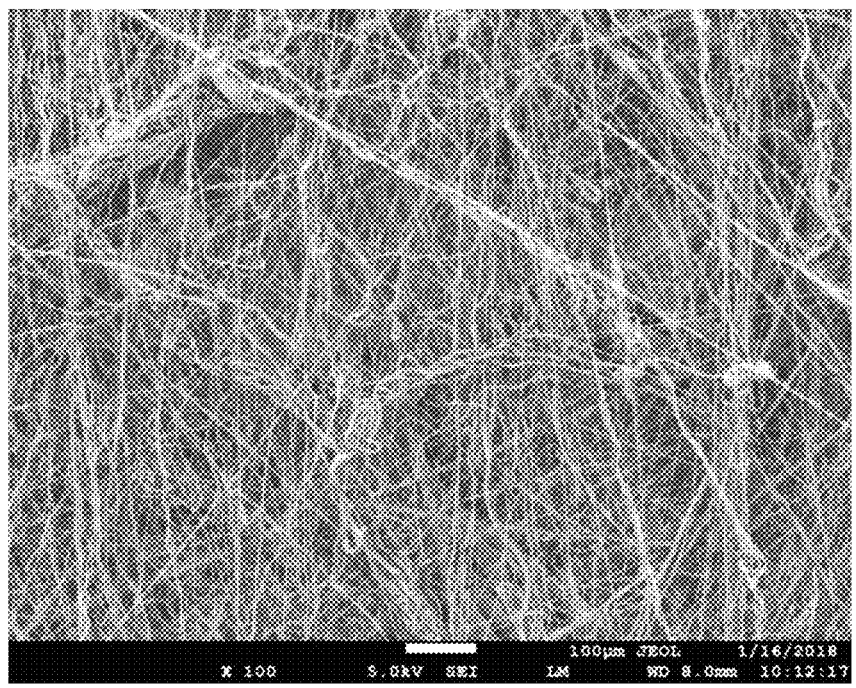
FIG. 6 is a photomicrograph of a nanofiber of nylon 66 with an RV of 36 at a magnification of 100×.

Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. In the various samples, the moisture levels of nylon 66 ranged from about 0.2% to about 1.0% (as shown in Table 2). An extruder with three zones was used, and the extruder operated at temperatures ranging from 233° C. to 310° C. The die temperature ranged from 286° C. to 318° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes, and neither the polyamide or the resultant product contained solvent.

Various fabrics were made with webs of nanofibers. The properties and performance characteristics of several specific samples are summarized in Table 2.

in various basis weights with a wide range of properties. Process settings can be adjusted to provide nanofiber fabrics with a variety of properties as required for the application as illustrated in Table 2.

Example 3

A nylon 66 polyamide composition with an RV in the range of 34 to 37 was used with the pack described in U.S. Pat. No. 7,300,272 to make nanofibers with an RV of about 16.8. This is a reduction in RV from polyamide composition to fabric of about 17.2 to 20.2 RV units. The polyamide composition contained about 1% moisture by weight and was run on a small extruder with three zones ranging in temperature from 233 to 310° C. A die temperature of about 308° C. was used. No solvents or adhesives were used during the melt spinning or deposition processes, and neither the polyamide or the resultant product contained solvents or adhesive.

Example 4

A nylon 66 polyamide composition with an RV in the range of 34 to 37 with the pack described in U.S. Pat. No. 7,300,272 to make nanofibers with an RV of about 19.7. This is a reduction in RV from polyamide composition to fabric of about 14.3 to 17.3 RV units. The polyamide composition contained 1% moisture by weight and was run on a small extruder with three zones ranging in temperature from 233 to 310 C. A die temperature of about 277° C. was used. No solvents or adhesives were used during the melt spinning or deposition processes, and neither the polyamide or the resultant product contained solvent or adhesive.

Example 5

A nylon 66 polyamide composition with an RV in the range of 34 to 37 was used with 2% nylon 6 blended in. The

TABLE 2

Example 2: Precursor Polyamide and Product Properties

| Sample | Product RV | Average Fiber diameter, (microns) | Basis weight, (gsm) | Nanofiber layer thickness (microns) | Air permeability (CFM/ft²) | Mean pore size diameter (microns) | Mean pore size pressure (PSI) | Filtration Efficiency (%) |
|---|---|---|---|---|---|---|---|---|
| 3 | 27.45 | 0.374 | 3.0 | N/A | 187.20 | 10.123 | 0.653 | 24.69 |
| 4 | 25.17 | 0.595 | 21.2 | N/A | 21.86 | 5.001 | 1.320 | 76.70 |
| 5 | 28.27 | 0.477 | 1.0 | N/A | 1002.00 | 84.123 | 0.81 | 2.71 |
| 6 | 22.93 | 0.5765 | 2.8 | 44.8 | 353.8 | 19.95 | 0.358 | 10.38 |
| 7 | 24.11 | 0.6008 | 7.3 | 60 | 757.2 | 7.85 | 0.919 | 40.68 |
| 8 | 23.91 | 0.4900 | 10.1 | 88 | 52.9 | 5.89 | 1.12 | 52.6 |
| 9 | 23.80 | 0.5950 | 13.2 | 101.5 | 75.72 | 7.185 | 1.235 | 66.00 |

As indicated in Table 2, the disclosed process surprisingly yields nanofibers and nonwoven mats having synergistic combinations of features. The nanofiber nonwoven mats were successfully made using the above described process, pack described in U.S. Pat. No. 7,300,272 was used to make nanofibers with an RV of about 17.1. This is a reduction in RV from polyamide composition to fabric of about 16.9 to 19.9 RV units. The polyamide composition contained 1% moisture by weight and was run on a small extruder with three zones ranging in temperature from 233 to 310° C. A die temperature of about 308° C. was used. No solvents or adhesives were used during the melt spinning or deposition processes, and neither the polyamide or the resultant product contained solvent or adhesive.

Example 6

Seven polyamide compositions with varied RV's were provided as shown below in Table 3. The pack described in U.S. Pat. No. 7,300,272 was used to make nanofibers with RV values as reported below. Samples were made on a small extruder with a high residence time. Initially, Samples 10 and 11 were made by feeding more than enough chips into the feed hopper of the extruder. In order to reduce the transition time between items, the extruder and die (or pack) were starved of polyamide composition after Sample 11. This example shows that a wide variety of nylon copolymers can be used to make nylon nanofibers with fiber diameters in the 0.53 to 0.68 micron range. Fiber diameters may be changed by changing process parameters, polymer formulations, or polymer types (copolymers). Based on the way the samples were created, it is difficult to draw conclusions on the degradation indices of these fabrics other than Samples 10 and 11. Samples 10 and 11 indicate that the addition of nylon 6 decreased the thermal degradation of the final nanofiber fabric. Comparing these samples to sample 16 also shows that adding nylon 6 decreases the fiber diameter. Sample 13 shows that the RV was reduced from 303.1 to 33.3. This is a reduction of 269.8 units or an 89% reduction in RV.

TABLE 3

Example 6: Precursor Polyamide and Product Properties

| Sample | Components | Polyamide RV | % Nylon 6, 6 | Moisture (%) | Fiber Diameter (microns) | Product RV | ODI (ppm) | TDI (ppm) |
|---|---|---|---|---|---|---|---|---|
| 10 | Nylon 66/nylon 6 | 39.2 | 16 | 0.0810 | 0.531 | 29.7 | 75 | 798 |
| 11 | Nylon 66/nylon 6 | 33.0 | 23 | 0.077 | 0.540 | 35.9 | 142 | 169 |
| 12 | Nylon 66 | 123.7 | 100 | 0.0351 | 0.588 | 39.1 | 182 | 1613 |
| 13 | Nylon 66 | 303.1 | 100 | 0.0177 | 0.638 | 33.3 | 208 | 1792 |
| 14 | Nylon 66/nylon 6I | 43.6 | 85 | 0.087 | 0.588 | 26.1 | 172 | 2232 |
| 15 | Nylon 66/nylon 6T | 44.8 | 65 | 0.0422 | N/A | N/A | 224 | 2383 |
| 16 | Nylon 66 | 36 | 100 | 0.022 | 0.684 | 15.2 | 1430 | >4000 |

Example 7

Figure 7:
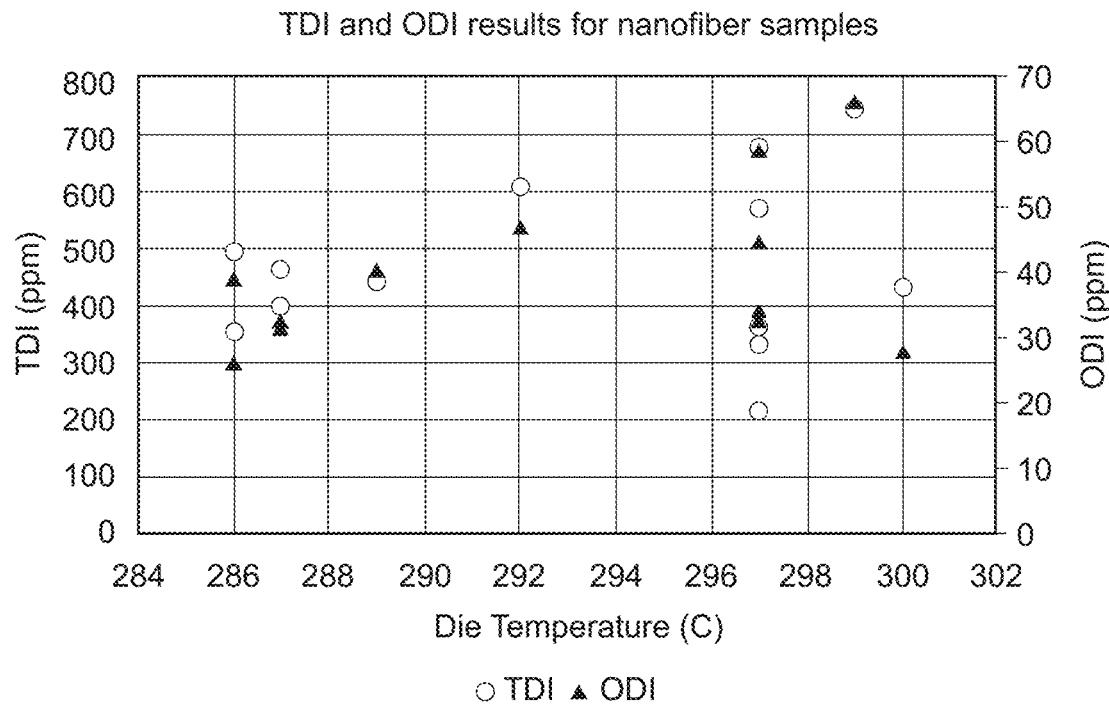
FIG. 7 is a graph comparing thermal degradation index and oxidative degradation index values for nanofiber samples as a function of die temperature.
Figure 8:
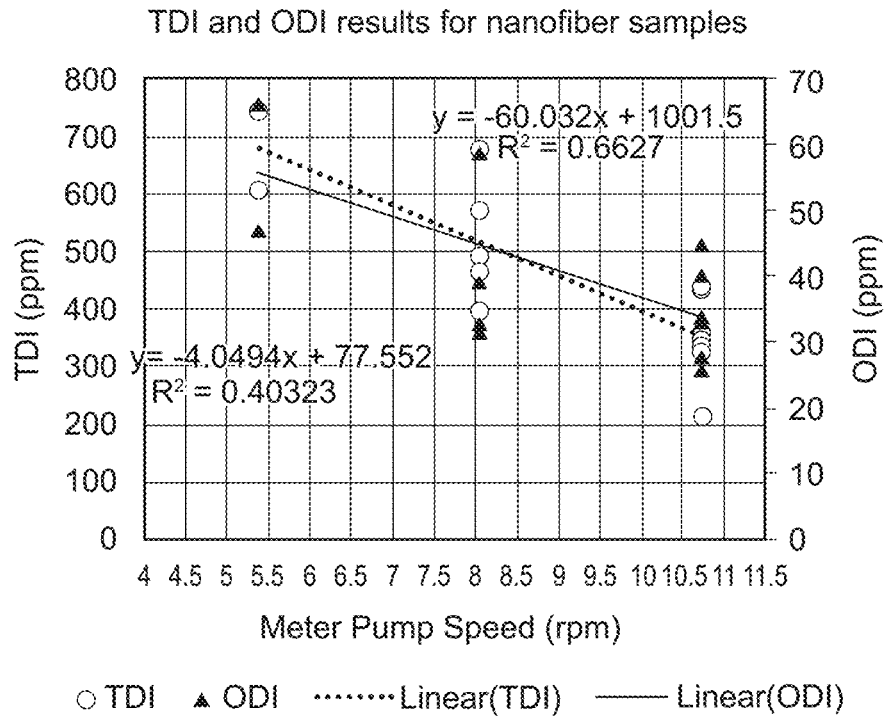
FIG. 8 is a graph comparing thermal degradation index and oxidative degradation index values for nanofiber samples as a function of meter pump speed.

A series of examples were run to test nanofiber samples for TDI and ODI as a function of die temperature. The same nylon 66 polyamide composition with an RV in the range of 34 to 37 that was used in example 3 was run in each of these samples. These samples were made on a slightly larger extruder and a much larger die (pack) with a much smaller residence time than those in Table 3 with the same polyamide composition as that used to make sample 16. The die temperature, basis weight, and flake moisture were varied. Table 4 below shows the conditions and results. The results are also shown in the graphs in FIGS. 7 and 8. As shown in Table 4 below, changing process variables does not dramatically change the ODI, illustrating a robust process for oxidative degradation. As shown in FIG. 8, as the meter pump speed decreased, the ODI and TDI generally increased with the TDI increasing at a higher percentage than the ODI. When compared to Sample 16 in Table 3, these samples show that the ODI and the TDI were lowered as this equipment used to run the nanofiber nonwoven fabric was designed for a lower residence time.

TABLE 4

Example 7: TDI and ODI Values

| Sample | Moisture (%) | Basis Weight | Die Temperature (° C.) | Meter Pump Speed (rpm) | TDI (ppm) | ODI (ppm) |
|---|---|---|---|---|---|---|
| 16 | 0.2 | 13.20 | 299 | 5.37 | 745 | 66 |
| 17 | 0.2 | 18.40 | 292 | 5.37 | 608 | 47 |
| 18 | 0.3 | 3.7 | 297 | 8.05 | 572 | 59 |
| 19 | 0.2 | 3.2 | 297 | 8.05 | 676 | 59 |
| 20 | 0.2 | 6.2 | 297 | 10.73 | 214 | 34 |
| 21 | 0.2 | 11 | 297 | 10.73 | 364 | 33 |
| 22 | 0.2 | 11 | 297 | 10.73 | 333 | 45 |
| 23 | 0.2 | 4.4 | 287 | 8.05 | 398 | 33 |
| 24 | 0.2 | 6.1 | 286 | 10.73 | 354 | 26 |
| 25 | 0.2 | 8 | 286 | 8.05 | 492 | 39 |
| 26 | 0.3 | 4.1 | 287 | 8.05 | 464 | 32 |
| 27 | 0.3 | 6 | 300 | 10.73 | 433 | 28 |
| 28 | 0.3 | 6 | 289 | 10.73 | 441 | 40 |

Example 8

Nylon 66 polyamide having an RV of 36 was melt spun and pumped to melt blown dies (utilizing the melt spin pack described in U.S. Pat. No. 7,300,272 and illustrated in FIG. 5) to produce nonwoven nanofiber webs. The moisture level of nylon 66 was about 0.22%. An extruder with three zones was used, and the extruder operated at temperatures ranging from 233° C. to 310° C. The die temperature was 295° C. Heated air was used as the gas. The nanofibers were deposited onto a 10 gsm thermally bonded, nylon spunbond scrim commercially available from Cerex Advanced Fabrics, Inc. under the trademark PBN-II®. Of course, other spunbond fabrics can be used, for example, a polyester spun bond fabric, a polypropylene spunbond fabric, a nylon melt blown fabric or other woven, knit, needlepunched, or other nonwoven fabrics. No solvents or adhesives were used during the melt spinning or deposition processes, and neither the polyamide or the resultant product contained solvent or adhesive. The collector belt speed was set to make a fabric with a nylon 6,6 nanofiber layer of 82 gsm basis weight. This fabric had an efficiency of 97.9%, a pressure drop of 166.9 Pascals and a penetration of 2.1% as measured using the TSI 3160 previously discussed. This fabric had a mean flow pore diameter average of 5.8 microns with a range from 3.2 to 8 microns. The air permeability of this fabric was 8.17 cfm/square foot. The thickness of the nanofiber layer was 625 microns.

Example 9 (Comparative)

Nylon 66 polyamide was melt spun into nonwoven samples 29 and 30 utilizing a centrifugal spinning process where polymer fibers are formed by spinning the melt through a rotating spinneret. Description of the centrifugal spinning process is seen in U.S. Pat. No. 8,658,067; WO 2012/109251; U.S. Pat. No. 8,747,723 to Marshall et al., and U.S. Pat. No. 8,277,771. This process produced nylon nanofiber fibers with extraordinarily high TDI and ODI indices. These results are much greater than the samples in Example 7 made with the melt blown process described herein.

TABLE 5

Nanofiber fabrics made with centrifugal spinning process

| Sample | Fabric RV | TDI (ppm) | ODI (ppm) |
|---|---|---|---|
| 29 | 22 | 3759 | 1739 |
| 30 | 14.2 | 4378 | 3456 |

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A nanofiber nonwoven product comprising polyamide nanofibers and at least one additive, wherein the polyamide of the nanofibers comprises a nylon, nylon copolymer, nylon terpolymer, nylon blend, nylon derivative, or combinations thereof, wherein the at least one additive comprises an oil, a wax, a solvent, a stabilizer, a delusterant, an antioxidant, a colorant, a pigment, a dye, or combinations thereof wherein the polyamide of the nanofibers have a relative viscosity from 10 to 330, and wherein the nanofibers have an average diameter from 100 to 950 nanometers.

2. The nanofiber nonwoven product according to claim 1, wherein the nanofiber nonwoven product comprised staple nanofibers.

3. The nanofiber nonwoven product according to claim 1, wherein the nanofiber nonwoven product comprises continuous nanofibers.

4. The nanofiber nonwoven product according to claim 1, wherein the melt point of the nanofiber nonwoven product is between 223° C. and 390° C.

5. The nanofiber nonwoven product according to claim 1, wherein the product has an Air Permeability Value of less than 600 CFM/ft$^2$.

6. The nanofiber nonwoven product according to claim 1, wherein the polyamide nanofibers further comprise at least one of a polyolefin, a polyacetal, a polyester, a cellulose ether, a cellulose ester, a polyalkylene sulfide, a polyarylene oxide, a polysulfone, and combinations thereof.

7. The nanofiber nonwoven product according to claim 1, wherein the polyamide nanofibers further comprise at least one of polyethylene, a polybutylene terephthalate, a polypropylene, a poly(vinylchloride), a polymethylmethacrylate, a polystyrene, a poly(vinylidene fluoride), a poly(vinylidene chloride), a polyvinyl alcohol, or combinations thereof.

8. The nanofiber nonwoven product according to claim 1, wherein the polyamide nanofiber comprises Nylon 6, Nylon 66, Nylon 6,10, or combinations thereof.

9. The nanofiber nonwoven product according to claim 1, wherein the polyamide nanofiber comprises at least 0.1 wt. % Nylon 6, Nylon 66, Nylon 6I, Nylon 6T, or combinations thereof.

10. The nanofiber nonwoven product according to claim 1, wherein from 1 to 20% of the nanofibers have a fiber diameter of greater than 700 nanometers.

11. The nanofiber nonwoven product according to claim 1, wherein all additives are present in a total amount from 0.01 to 49 wt. %, based on the total weight of the nanofiber nonwoven product.

12. The nanofiber nonwoven product according to claim 1, wherein the additive comprises a zinc compound.

13. The nanofiber nonwoven product according to claim 1, wherein the additive comprises zinc oxide.

14. The nanofiber nonwoven product according to claim 1, wherein the additive comprises a copper compound.

15. The nanofiber nonwoven product according to claim 1, wherein the nanofiber nonwoven product has a TDI from 20 to 400 ppm and an ODI from 1 to 200 ppm.

16. The nanofiber nonwoven product according to claim 1, wherein the nanofiber nonwoven product comprises less than 5000 ppm solvent.

17. The nanofiber nonwoven product according to claim 1, wherein the nanofiber nonwoven product has a filtration efficiency from 1 to 99.999%.

18. A nanofiber nonwoven product comprising polyamide nanofibers, wherein the polyamide of the nanofibers comprises a non-nylon polyamide, wherein the polyamide of the nanofibers have a relative viscosity from 4 to 330, and wherein the nanofibers have an average diameter from 100 to 950 nanometers.

* * * * *